March 30, 1943.   A. R. VAN C. WARRINGTON   2,315,471
PROTECTIVE SYSTEM
Filed March 14, 1941
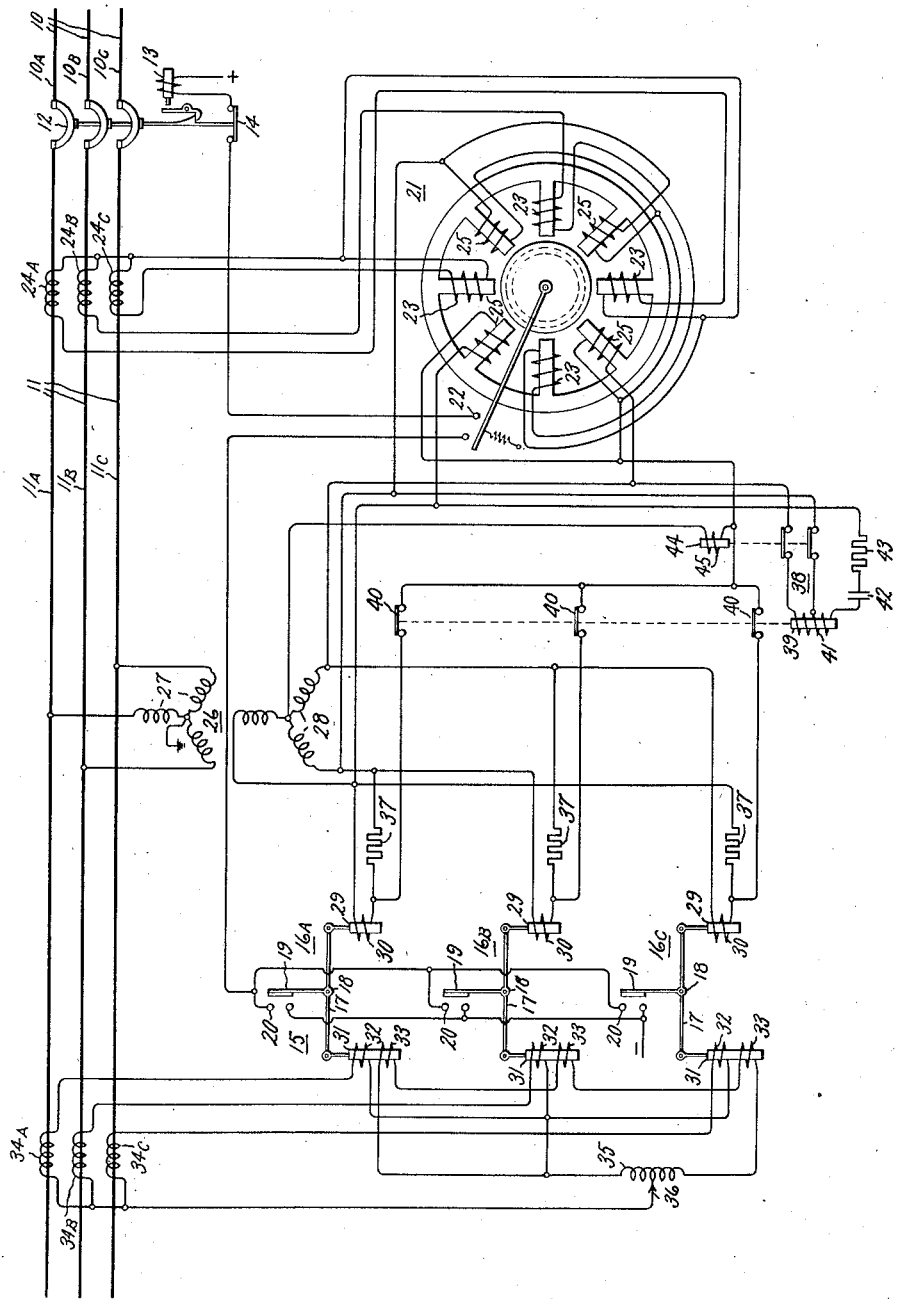
Inventor:
Albert R. van C. Warrington,
by Harry E. Dunham
His Attorney.

Patented Mar. 30, 1943

2,315,471

UNITED STATES PATENT OFFICE 2,315,471

PROTECTIVE SYSTEM

Albert R. van C. Warrington, Wallingford, Pa., assignor to General Electric Company, a corporation of New York Application March 14, 1941, Serial No. 383,309

10 Claims. (Cl. 175—294)

My invention relates to protective systems for electric circuits and more particularly to protective systems employing relays of the distance type.

Electric circuits, as is well known to those skilled in the art, are subject to several different kinds of faults. A polyphase electric circuit, for example, and more particularly the common three-phase electric circuit may be subject to line-to-line faults, line-to-ground faults, double line-to-ground faults, and three-phase faults. In order to protect against faults involving ground as well as those not involving ground, two separate sets of relays were usually used. It would be desirable to provide a distance relay protective system for a polyphase circuit wherein one set of relays would properly protect against all types of faults that might occur.

In my copending application, Serial No. 375,208, filed January 21, 1941, and assigned to the same assignee as the present application, I have disclosed and broadly claimed a protective system embodying a single set of relays which protects against all types of faults that might occur by changing the current and potential connections of the distance relays under predetermined fault conditions. The arrangement disclosed and claimed in this copending application provides the proper protection under all conditions since the distance relay has the same reach regardless of the type of fault which occurs.

It would be desirable to provide a distance relay which would protect against all types of faults on a three-phase system and, furthermore, operate similarly for all faults at a predetermined distance from the relay independently of the number of circuit conductors involved in the fault and whether or not ground faults are involved without requiring any change in the current connections to the distance relay. Such an arrangement would, of course, greatly reduce the cost since suitable devices for changing the current connections are relatively expensive. Furthermore, such a distance relay would have the same advantage as that disclosed in my copending application referred to above in that it could be used with a polyphase directional relay. Also since more than 90% of all faults which occur are ground faults it would be desirable to provide an arrangement which responds without delay to such ground faults.

It is an object of my invention, therefore, to provide a new and improved protective system involving a minimum number of distance relays for giving complete and accurate protection for all types of faults which might occur on a three-phase system by merely changing the potential connections of said distance relay under predetermined fault conditions.

It is another object of my invention to provide a new and improved polyphase distance relay in which no change in the current connections to the relay is required and yet wherein the correct distance measurements are obtained independently of the number of conductors involved in the fault and whether or not ground faults are involved.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which the single figure thereof diagrammatically illustrates a protective system embodying my invention utilizing a polyphase distance relay of the impedance type.

Referring now to the drawing, I have illustrated my protective system as applied to a three-phase alternating-current system. As shown the system comprises a three-phase bus 10 including the respective phase conductors 10A, 10B, and 10c, and a three-phase transmission line 11 including conductors 11A, 11B, and 11c, respectively. The polyphase system comprising bus 10 and transmission line 11 is illustrated as being interconnected through a suitable circuit-interrupting means, such as latched closed circuit breaker 12. This circuit breaker is provided with a trip coil 13 and an "a" auxiliary switch 14, which is closed when the circuit breaker is closed and open when the circuit breaker is open.

In order to protect the polyphase system from faults occurring on transmission line 11, I provide a polyphase distance relay or electroresponsive device generally indicated at 15 which comprises three impedance responsive relays 16 specifically designated by 16A, 16B, and 16c, respectively. It will be understood by those skilled in the art that relays responsive to the reactance of the system could equally well be used and accordingly it is intended that the term "impedance responsive relays" includes reactance responsive relays as well. These impedance relays 16 have been schematically illustrated as of the balanced-beam type comprising a beam member 17 centrally pivoted at 18. Each of the impedance type relays 16 is provided with a contact arm 19 adapted to bridge contacts 20. These contacts 20 for the respective impedance type relays 16A, 16B, and 16c are arranged in parallel and connected in the strip circuit of circuit breaker 12 in series with trip coil 13 so that operation of any one of the impedance relays 16 will cause energization of trip coil 13 and tripping of circuit breaker 12.

As will be obvious to those skilled in the art, the polyphase distance relay generally indicated at 15 does not have directional characteristics and, consequently, would operate in response to faults in either direction from the relay within the critical distance for which it is set to operate. In order to prevent the tripping of circuit breaker 12 for faults not on the protected section of transmission line 11, I provide an electroresponsive device generally indicated at 21, illustrated as a polyphase directional relay for controlling contacts 22, which are shown connected in the circuit of trip coil 13, so that tripping of circuit breaker 12 will not occur unless power directional relay 21 operates to indicate that the fault is in the section of line 11 being protected. Relay 21 is provided with a plurality of current windings 23 energized in accordance with the current flowing in power line 10 by virtue of current transformers 24A, 24B, and 24c, respectively, and a plurality of potential windings 25 energized in accordance with the potential of the protected polyphase circuit through polyphase transformer 26 illustrated as having a Y-connected primary winding 27 associated with transmission line 11 and a Y-connected secondary winding 28 connected to the respective potential windings 25. Since the construction per se of the polyphase power directional relay 21 forms no part of the present invention, no further discussion will be included herewith except to point out that this relay is illustrated as of the induction-cup type having the so-called "quadrature connections" identical with those disclosed in Fig. 9 of United States Letters Patent 2,110,673, granted March 8, 1938, upon an application of Andrew J. McConnell, and assigned to the same assignee as the present application.

Each of the balanced-beam members 17 of the impedance type relays 16A, 16B, and 16c is provided at one end thereof with a solenoid 29 having a voltage-restraining winding 30. At the other end of each of the beam members is a solenoid 31 having a pair of current windings 32 and 33, respectively, for producing an operating torque to cause bridging of contacts 20 of one or more of the impedance relays 16A, 16B, or 16c under all fault conditions on the protected section of power line 10 within a predetermined distance from the polyphase electroresponsive device 15.

In my copending application referred to above, it was shown that for all fault conditions except line-to-line faults, that is, for three-phase faults, line-to-ground faults, and double line-to-ground faults, the following relationship hold:

$$\frac{E_A}{I_A + KI_R} = Z_1 \quad (1)$$

$$\frac{E_B}{I_B + KI_R} = Z_1 \quad (2)$$

$$\frac{E_C}{I_C + KI_R} = Z_1 \quad (3)$$

where K is a constant, $I_R$ is the residual current or, in other words, the sum of the zero-phase-sequence components of current in the three phases of the circuit, $Z_1$ is the positive-phase-sequence impedance between the fault and the point at which the relay potentials are measured, $E_A$, $E_B$, and $E_C$ represent the respective phase or line-to-neutral voltages, and $I_A$, $I_B$, and $I_C$ represent the respective line currents. From the above equations, it will be obvious to those skilled in the art that, if the potential windings 30 of impedance relays 16A, 16B, and 16c are energized with line-to-neutral voltages $E_A$, $E_B$, and $E_C$, respectively, and the solenoids 31 are energized with the corresponding line plus a predetermined amount of residual current, then impedance relays 16A, 16B, and 16c will give complete protection including the same distance response for all faults which might occur on power line 10 except line-to-line faults. The expression "line-to-line" is used in this disclosure in the generally accepted sense as including only two lines or phases.

Accordingly, I have provided a plurality of current transformers associated with polyphase transmission line 11 having secondary windings 34A, 34B, and 34c, respectively. The current winding 32 of impedance relay 16A is connected across the secondary winding 34A so as to be energized in accordance with the current $I_A$ flowing in line 10A. Similarly, the current windings 32 of impedance relays 16B and 16c, respectively, are connected across secondary windings 34B and 34c so as to be energized in accordance with line currents $I_B$ and $I_C$, respectively. In order to provide a predetermined proportion of residual current necessary to cooperate in producing the operating torques for impedance relays 16A, 16B, and 16c, the windings 33 are residual current windings energized with the residual current from the current transformers having secondary windings 34A, 34B, and 34c. In order to adjust for the proper value of K in Equations 1 to 3 above, I have provided an autotransformer 35 connected in series with the residual current windings 33 and having an adjustable tap 36 by means of which the proportion of residual current may be adjusted for any particular system.

The voltage-restraining windings 30 of impedance type relays 16A, 16B, and 16c, respectively, are energized from the three-phase alternating-current system through potential transformer 26. Winding 30 of impedance relay 16A is normally connected to be energized with the potential $E_A$ while winding 30 of impedance relay 16B is normally connected to be energized with the potential $E_B$ and winding 30 of impedance relay 16c is normally connected to be energized with the potential $E_C$, the Y-connected secondary winding 28 of transformer 26 enabling line-to-neutral voltages to be obtained therefrom.

With the arrangement described thus far, electroresponsive device 15 will operate correctly and give the same distance response under all fault conditions on power line 10 except line-to-line faults. Since a great percentage of faults involved on transmission lines involve ground, polyphase distance relay 15 will give complete protection for most fault conditions without changing any of the connections thereof. However, in the event of a line-to-line fault, the connections described thus far will not give the same distance response as for the other types of faults. In my copending application referred to above, it was shown that the same distance response set forth in Equations 1, 2, and 3 above, namely, the positive-phase-sequence impedance between the relay and the point at which the relay potentials are measured would be obtained under line-to-line fault conditions if the impedance relay had the voltage-restraining windings 30 thereof energized with the delta or lineto-line voltages involved in the fault and the current windings energized with effective delta current of the phases involved in the fault. In other words, if impedance relays 16A, 16B, and 16c satisfy the following relationships, respectively, under line-to-line fault conditions, proper operation thereof would be obtained:

$$\frac{E_{AB}}{I_A - I_B} = Z_1 \quad (4)$$

$$\frac{E_{BC}}{I_B - I_C} = Z_1 \quad (5)$$

$$\frac{E_{CA}}{I_C - I_A} = Z_1 \quad (6)$$

But under line-to-line fault conditions, the currents flowing in the two faulted lines are equal and 180 degrees out of phase. With this in mind, the Equations 4, 5 and 6 above for the particular phases involved in the fault may be simplified as follows:

$$\frac{\frac{E_{AB}}{2}}{I_A} = Z_1 \quad (4a)$$

$$\frac{\frac{E_{BC}}{2}}{I_B} = Z_1 \quad (5a)$$

$$\frac{\frac{E_{CA}}{2}}{I_C} = Z_1 \quad (6a)$$

Equations 4a, 5a and 6a show, therefore, that, under line-to-line fault conditions, impedance relays 16A, 16B, and 16c will have the same distance response as for three-phase, line-to-ground or double line-to-ground faults, in which latter case the voltage-restraining windings are energized with line-to-neutral voltages and an operating torque proportional to line currents plus a predetermined amount of residual current is provided, if the operating torque is made proportional to the line current and the restraining torque proportional to half the line-to-line voltages. Since there is no residual current under line-to-line fault conditions, residual current windings 33 will be ineffective and the total operating torque will be proportional to the line current. Consequently, with the arrangement shown in the drawing, no change in the connections of the current windings will be necessary regardless of the type of fault involved. However, a change in the connections for the potential windings 30 will be necessary since, when phase-to-phase faults are involved, the energization of windings 30 should be changed from line-to-neutral potentials to half the line-to-line potentials.

Accordingly, I have connected each of the windings 30 of impedance relays 16A, 16B, and 16c across the line-to-line voltages appearing at the terminals of secondary winding 28 of polyphase potential transformer 26. In order to cut this potential in half I have connected in series with the line-to-line potential and voltage restraining windings 30 a suitable impedance 37 so that half the line-to-line potential drop appears across this impedance. Winding 30 of impedance relay 16A is arranged, therefore, to be energized with the potential $$\frac{E_{AB}}{2}$$

when the line-to-neutral potential of this winding is removed. Similarly, winding 30 of impedance relay 16B is energized with a line-to-line potential $$\frac{E_{BC}}{2}$$

when the line-to-neutral voltage normally impressed across this winding is removed. Also winding 30 of impedance relay 16c is energized with a potential $$\frac{E_{CA}}{2}$$

The line-to-line potentials are always impressed across windings 30 but, whenever the line-to-neutral potentials are also impressed thereacross, the latter determine the potential of restraining windings 30 and it is only when the line-to-neutral potentials are removed that the line-to-line potentials divided by two are rendered effective.

If, therefore, the line-to-neutral potentials are rendered ineffective only upon the occurrence of line-to-line faults on transmission line 11, then electroresponsive device 15 will give complete protection for all types of faults occurring on line 11 and, furthermore, will have the same distance response for all of these faults. Since a line-to-line fault is the only type of fault characterized by the presence of negative-phase-sequence components of current and voltage without the presence of any zero-phase-sequence components of current and voltage, a simple means for distinguishing line-to-line faults from other types of faults is provided. Any suitable means, therefore, which will operate upon the occurrence of negative-phase-sequence components of current or voltage when no zero-phase-sequence components of current or voltage are present may be utilized to control the potential connections of windings 30 by rendering the line-to-neutral potentials for energizing these voltage-restraining windings 30 ineffective and allowing these windings to be energized with one-half of the respective line-to-line voltages whenever a line-to-line fault occurs. Such a means, operative only when negative-phase-sequence components of current or voltage exist without the presence of zero-phase-sequence components of current or voltage, might be accomplished by means of power-directional relays which are available in forms which will operate only upon the existence of zero-phase-sequence components and others which will operate only upon the existence of positive or negative-phase-sequence components. It will be obvious to those skilled in the art that a combination of these devices could be utilized to distinguish between line-to-line faults. However, in the drawing, I have chosen to illustrate a suitable means for distinguishing line-to-line faults from other faults as comprising a negative-phase-sequence voltage relay 38 comprising a solenoid 39 for controlling a plurality of contacts 40 which are in the respective neutral connections leading from potential transformer 28 to the voltage-restraining windings 30 of impedance relays 16A, 16B, and 16c. Solenoid 39 is energized by negative-phase-sequence voltage appearing across the secondary winding 28 of potential transformer 26. This negative-phase-sequence potential may be segregated by a negative-phase-sequence filter network including tapped winding 41 of solenoid 39, capacitor 42, and resistor 43 connected in a manner well understood by those skilled in the art.

Since negative-phase-sequence potentials may exist during ground fault conditions as well as during line-to-line fault conditions, it is necessary to prevent contacts 40 from rendering the line-to-neutral potentials across voltage-restraining windings 30 ineffective unless there are no zero-phase-sequence quantities such as currents or voltages in alternating-current line 11. Accordingly, I provide a solenoid operated contactor 44 having its winding 45 connected in series with the neutral of secondary winding 28 of potential transformer 26 for rendering the negative-phase-sequence network ineffective upon the existence of zero-phase-sequence voltages so that contacts 40 will open only upon the occurrence of negative-phase-sequence voltage without zero-phase-sequence voltages or, in other words, only upon the occurrence of line-to-line faults on transmission line 11. It will be understood that any suitable means for energizing winding 45 of contactor 44 with a zero-phase-sequence potential may be provided. Instead of connecting this winding 45 in the neutral circuit directly, as shown in the drawing, potential transformer 26 might be provided with a suitable open delta tertiary winding across which winding 45 might be connected.

The operation of the protective system embodying my invention will be obvious to those skilled in the art in view of the detailed description included above. Under all conditions except the existence of line-to-line faults, contacts 40 will be closed, so that impedance relays 16A, 16B, and 16c are provided with operating torques proportional to line currents plus a predetermined amount of residual current and a restraining torque proportional to the line-to-neutral voltages of the protected circuit. Upon the occurrence of a line-to-line fault, however, solenoid operated contactor 44 will not be energized since there are no zero-phase-sequence voltages involved, and, therefore, the negative-phase-sequence filter involving inductance 41, capacitor 42 and resistor 43 will be effective to cause actuation of contacts 40 by virtue of the existence of negative-phase-sequence voltages on the alternating-current circuit. Operation of contacts 40, therefore, removes the line-to-neutral potentials from voltage-restraining windings 30 and the potential across these windings then becomes one half the line-to-line potentials by virtue of the impedances 37. Since there are no residual currents under line-to-line fault conditions, the operating torque of impedance relays 16 will be proportional to the respective line currents. Of course, power directional relay 21 will prevent tripping of circuit breaker 12 unless the fault is in the protected section of the transmission line 11.

In the arrangement just described, the same distance response will be obtained under all fault conditions with no delay except under phase-to-phase fault conditions. Furthermore, the delay required under phase-to-phase fault conditions in order to allow contacts 40 to operate may be very short since contacts 40 may be operated at high speed.

Although I have disclosed particular connections for electroresponsive device 15 with means for switching the potential connections by differentiating between different kinds of faults in response to the presence or absence of various phase-sequence-components of current and voltage, it will be understood by those skilled in the art that various arrangements for distinguishing between different kinds of faults and changing the various connections might be provided. I have chosen in the instant case to distinguish a line-to-line fault by the existence of negative-phase-sequence voltage without the existence of zero-phase-sequence voltage. It is, of course, understood by those skilled in the art that a three-phase fault could be distinguished by the presence of only positive-phase-sequence voltage or current whereas faults involving ground are likely to include positive, negative, and zero-phase-sequence components of current and voltage.

While I have described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In a protective system for an alternating-current electric circuit comprising an electroresponsive device having current and potential windings, means for energizing said current and potential windings in accordance with the currents and potentials of said alternating-current circuit, and phase-sequence relay means responsive to the presence of negative-phase-sequence quantities without the presence of zero-phase-sequence quantities for changing the connections of one of the windings of said electroresponsive device.

2. In a distance-responsive relay for protecting a polyphase alternating-current circuit comprising for each phase of said polyphase circuit current and potential windings arranged to be energized from said circuit, and phase-sequence relay means for controlling only the connections of said potential windings in accordance with the type of fault occurring on said circuit so that said relay has the same reach for all types of faults which might occur on said circuit regardless of the number of conductors involved in the fault or whether the fault involves ground.

3. In a distance responsive relay for protecting a polyphase alternating-current circuit comprising current and potential windings, means for energizing said current and potential windings in accordance with the currents and potentials of said alternating-current circuit, and phase-sequence relay means responsive to the presence of certain predetermined phase-sequence quantities and the absence of certain other phase-sequence quantities of said circuit for changing the connections of one of the windings of said distance responsive relay.

4. In a distance-responsive relay for protecting a polyphase alternating-current circuit comprising current and potential windings, means for energizing said current and potential windings in accordance with the currents and potentials of said alternating-current circuit, and phase-sequence relay means for controlling only the connections of said potential winding in accordance with the type of fault occurring on said circuit so that said relay has the same reach for all types of faults which might occur on said circuit regardless of the number of conductors involved in the fault or whether the fault involves ground.

5. In a polyphase distance-responsive device for protecting an alternating-current electric circuit comprising for each phase of said polyphase circuit current and potential windings, means for energizing each current winding so as to produce a torque proportional to one of the line currents of said circuit modified by a predetermined amount of residual current existing in said circuit, means for normally energizing each corresponding potential winding with the corresponding line-to-neutral potential of said circuit so that said distance-responsive device will have the same reach for all faults occurring on said circuit except line-to-line faults, and phase-sequence relay means for energizing each potential winding with one-half of the corresponding line-to-line voltage upon the occurrence of a line-to-line fault.

6. In a protective system for an alternating-current electric circuit comprising an electroresponsive device having current and potential windings, means for energizing said current and potential windings in accordance with the currents and potentials of said alternating-current circuit, and means responsive to the presence of certain predetermined phase-sequence quantities and the absence of certain other phase-sequence quantities of said circuit for changing the connections of said potential windings of said electroresponsive device.

7. In a distance-responsive relay for protecting a polyphase alternating-current circuit comprising current and potential windings, means for energizing said current and potential windings in accordance with the currents and potentials of said alternating-current circuit, and phase-sequence relay means responsive only to the existence of a line-to-line fault on said alternating-current circuit for changing the connections of one of the windings of said distance-responsive relay.

8. In a distance-responsive protective system for an alternating-current electric circuit comprising an electroresponsive device having current and potential windings, means for energizing said current and potential windings in accordance with the currents and potentials of said alternating-current circuit, and means responsive to the existence of a predetermined relationship between the phase-sequence quantities existing in said circuit for changing the energization of said potential windings of said electroresponsive device.

9. In a polyphase distance-responsive device for protecting an alternating-current electric circuit comprising for each phase of said polyphase circuit an impedance relay having current and potential windings, means for energizing each current winding of said impedance relays so as to produce an operating torque proportional to one of the line currents of said circuit modified by a predetermined amount of residual current existing in said circuit, means for normally energizing each corresponding potential winding of said impedance relays with the corresponding line-to-neutral potential of said circuit so that said distance-responsive device will have the same reach for all faults occurring on said circuit except line-to-line faults, and means including a negative-phase-sequence relay for causing each potential winding to be effectively energized with one-half of the corresponding line-to-line voltage upon the occurrence of a line-to-line fault.

10. In a polyphase distance-responsive device for protecting an alternating-current electric circuit comprising for each phase of said polyphase circuit an impedance relay having current and potential windings, means for energizing each current winding of said impedance relays so as to produce an operating torque proportional to one of the line currents of said circuit modified by a predetermined amount of residual current existing in said circuit, means for normally energizing each corresponding potential winding of said impedance relays with the corresponding line-to-neutral potential of said circuit so that said distance-responsive device will have the same reach for all faults occurring on said circuit except line-to-line faults, and phase-sequence means for changing the energization of the potential windings of said impedance relays upon the occurrence of a line-to-line fault so that said polyphase device has the same distance response for all fault conditions occurring on said alternating-current circuit.

ALBERT R. van C. WARRINGTON.